United States Patent

[11] 3,562,424

[72] Inventor Ernst Legler
Seeheim, Germany

[21] Appl. No. 747,509
[22] Filed July 25, 1968
[45] Patented Feb. 9, 1971
[73] Assignee Fernseh GmbH
Darmstadt, Germany
a corporation of Germany
[32] Priority July 28, 1967
[33] Germany
[31] F 53 089

[54] APPARATUS FOR IMPROVING THE CONTRAST FOCUSING OF A TV PICTURE BY APERTURE CORRECTING THE VIDEO TV SIGNAL ON BOTH SIDES
4 Claims, 1 Drawing Fig.

[52] U.S. Cl. ...... 178/7.1
[51] Int. Cl. ...... H04n 5/14
[50] Field of Search ...... 178/7.1 (A.C.)

[56] References Cited

UNITED STATES PATENTS

| | | | |
|---|---|---|---|
| 2,957,042 | 10/1960 | Gibson et al. | 178/7.1AC |
| 2,971,053 | 2/1961 | Gibson | 178/7.1AC |

*Primary Examiner*—Robert L. Richardson
*Attorney*—Ernest F. Marmorek

ABSTRACT: The invention is concerned with an apparatus for improving the contrast focusing of a TV picture by aperture correcting the video TV signal on both sides, that is in the vertical and horizontal directions.

PATENTED FEB 9 1971 3,562,424
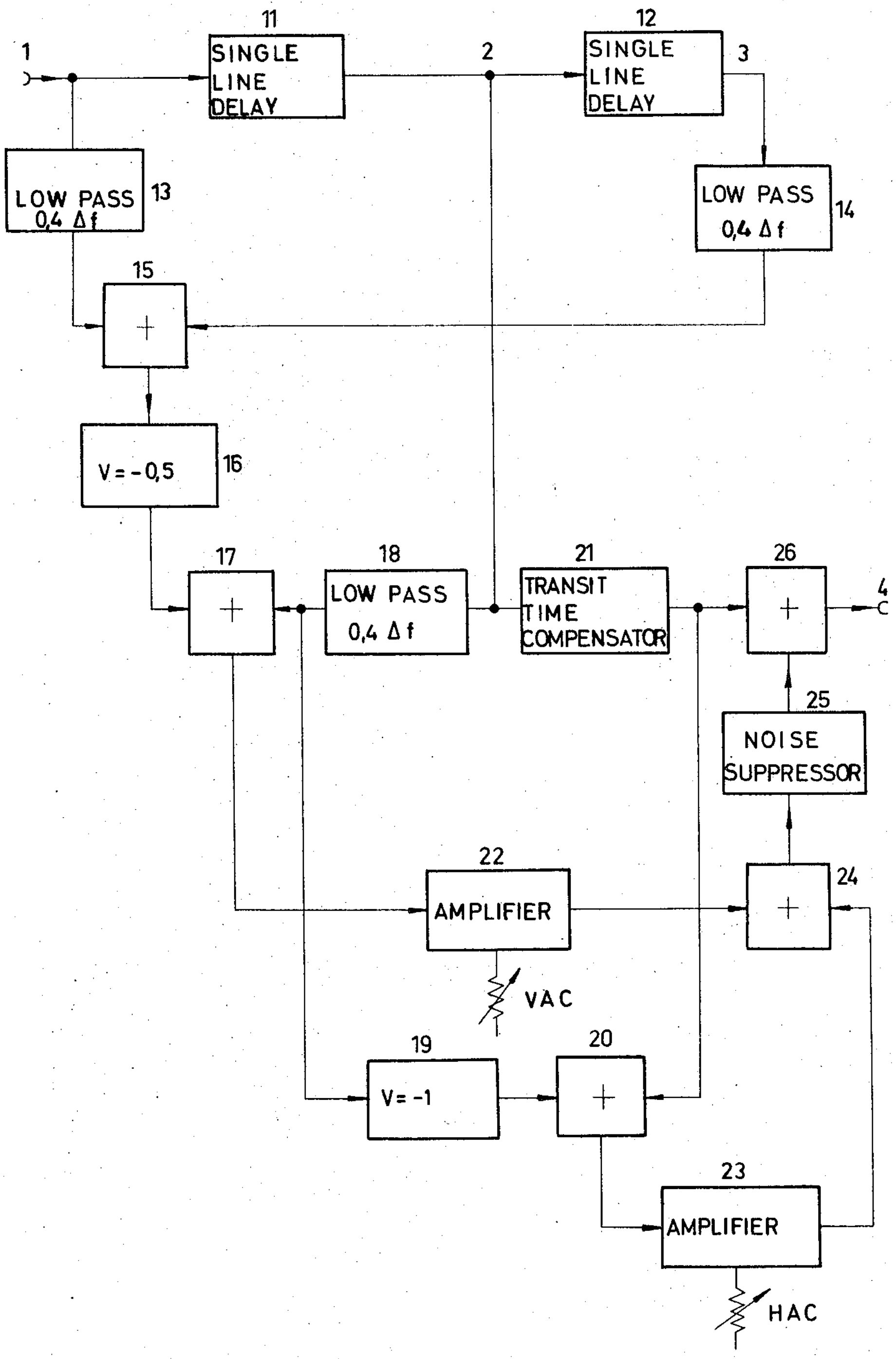
Inventor:
Ernst Legler
by
Attorney

APPARATUS FOR IMPROVING THE CONTRAST FOCUSING OF A TV PICTURE BY APERTURE CORRECTING THE VIDEO TV SIGNAL ON BOTH SIDES

The invention relates generally to an apparatus of TV picture focusing and, more particularly, it relates to an apparatus for focusing the contrasts of a TV picture by aperture correcting the video TV signal on both sides.

It is already known to improve the contour sharpness of a TV picture in the line direction by making aperture corrections to the picture signal. In a known improvement the TV signal is subjected to differentiation twice, after which a variable component of a correcting signal corresponding to the second derivative of the TV signal is added with reversed polarity to the TV signal. By this method only the sharpness of contours running approximately perpendicularly across the TV picture can be improved. It is, however, desirable to improve the sharpness of the TV picture in all directions, even the sharpness of those contours which run approximately horizontally across the TV picture.

It is known for vertical aperture corrections to obtain a correcting signal as the difference between a TV signal delayed by one line period and between the half sum of an undelayed and a twice delayed TV signal and, to add this correcting signal to the TV signal delayed by a line period.

It is an object of the present invention to provide a circuit arrangement for improving the contrast focusing of a TV picture in both the horizontal and vertical directions by aperture correcting the video TV signal on both sides. Other objects of the invention will in part be obvious and will in part appear hereinafter.

In accordance with one aspect, the invention a method provides for the improvement of the contrast focusing of a TV picture in both directions in which the correcting signal for the vertical aperture correction is formed as a difference between the TV signal delayed by a line period and between the half sum of the undelayed and that of the twice delayed TV signal and, in which the horizontal aperture correction is obtained from the TV signal delayed by a line period. Thereafter, the vertical and horizontal aperture correcting signals are added simultaneously to the TV signal delayed by a line period.

In accordance with the invention the correction signal for the horizontal aperture correction is preferably formed as the difference between a TV signal having a reduced bandwidth and between the same signal having a full bandwidth after affecting a transit time compensation between the two signals.

The invention finds a preferred area of utilization in the improvements of the sharpness of the contours in color TV pictures under the conditions when the video signal is produced by an equipment in which the luminance signal is obtained independently from the hue signals, that is, not from the hue signals.

The present invention from another aspect thereof resides in a circuit arrangement for increasing the sharpness of the horizontal and vertical contours in a television picture by aperture correcting the video signal, in which the combination comprises input means for a television signal, a first delay means connected to said input means for delaying the television signal by one line period, second delay means coupled to said first delay means for delaying said television signal by a further line period, adding means for combining said undelayed and twice delayed television signals into a sum signal, means for reversing the polarity of said sum signal and reducing the amplitude thereof to one-half, second adding means for combining the output of said polarity reversing means with said once delayed television signal for obtaining said vertical aperture correcting signal, means for reversing the polarity of said once-delayed signal, means for compensating said once-delayed television signal for transit time, third adding means for combining the output of the last-mentioned polarity reversing means and said compensating means for obtaining said horizontal aperture correcting signal, fourth adding means for combining the horizontal and vertical aperture correcting signals into a single correcting signal, and fifth adding means for combining the single correcting signal with the once-delayed television signal.

The invention will become more readily apparent from the following description of a preferred method and embodiment thereof, described with reference to and shown, by way of example, in the accompanying drawing, in which:

The single view shows a circuit diagram illustrating the contrast focusing circuit portions of a TV apparatus in a schematic fashion.

With reference to the single view, the TV or video signal which should be aperture corrected in accordance with the invention, is received at input 1 from which it enters a delay stage 11 in which such TV or video signal undergoes a delay for a line period. The delay stage 11 transfers the TV signal in its full bandwidth and without distortion, so that the TV signal appearing at point 2 after delay stage 11 has the same value as the TV signal which entered from input 1 except for the delay introduced by stage 11. This single line delay is necessary, since the single-line delayed signal will represent the output signal of the entire circuit after the correction signal has been added thereto.

The TV signal which has been delayed by a line period will undergo a further delay of another line period in a delay stage 12, so that at its output 3 such stage has a signal appearing thereat which is delayed by two line periods with respect to the signal at input 1. The undelayed TV signal will enter a low pass filter 13 which will reduce its bandwidth, while the signal delayed by two line periods will enter a low-pass filter 14 for similar purposes. The low-pass filters 13 and 14 suppress the high frequency portions of the TV signal and only pass a limited frequency bandwidth of about 40 percent of the original full frequency band. The band limiting for the signal delayed by two line periods may be effected partially also by delay stage 12 which may take the form of a delay line. It is noted that both delay stages 11 and 12 may take the form of delay lines.

The signals after having passed through the band limiting low-pass filters 13, 14 are added in an adding device 15 and the output of adding device 15 enters in the form of a sum signal a device 16 which rotates its phase by 180° and reduces its amplitude by half. The signal leaving device 16 enters into an adding stage 17 in which it is combined with the television or video signal delayed by a line period and taken off at point 2 after delay line 11 and subsequently passed through a low-pass filter 18 before entering adding stage 17. The once-delayed television signal in low-pass filter 18 has its bandwidth reduced and in adding stage 17 it becomes combined, as hereinafter described, in order to provide the vertical aperture correcting signal. Such vertical aperture correcting signal is formed from the difference between a once-delayed television signal and between the half sum of the undelayed and of the twice delayed television or video signal.

The band limitation of the television signal for use as a correcting signal is necessary in order to eliminate the noise components from the correcting signal and, as a result, the noise components will be much less apparent in the corrected signal than as if a correcting signal with full bandwidth had been used.

In accordance with the invention, the horizontal aperture correcting signal will be derived from a television or video signal which has been delayed by one line period. For this purpose, in accordance with the method of the invention, the difference between a once-delayed television signal taken off after the delay stage 11 at point 2 and having a full bandwidth is formed with a similar television signal having a limited bandwidth after it has passed through low-pass filter 18. The last-mentioned signal for this purpose is fed into a device 19 in order to undergo a 180° phase shaft and thereafter enters an adding stage 20 where it is combined with the television or video signal having a full bandwidth. The last-mentioned television signal having the full bandwidth is passed through a transit time compensation circuit 21 in order to compensate the signal delay experienced in low-pass filter 18.

The correcting signal for the vertical aperture correction after passing adding stage 17, and the correcting signal for the horizontal aperture correction after passing adding stage 20, enter each a variable gain control amplifier 22, 23, respectively, in which the amplitudes of each correcting signal are independently adjusted, as shown by symbols VAC and HAC, respectively. The Individually set components of the correcting signals enter a further adding stage 24 where they are combined into a single correcting signal for the vertical and horizontal aperture correction.

Before the combined signal appearing at the output of adding stage 24 would be keyed onto the television signal, it is passed through a device 25 having a nonlinear amplitude characteristic and which suppresses signals having small amplitudes while passing signals with large amplitudes The threshold level of this nonlinear device is selected such that the noise component in the combined correcting signal will be substantially suppressed or at least substantially weakened. After the combined correcting signal has been freed from the noise components, it enters into a last adding stage 26 wherein it is added to the television or video signal which has been delayed by one line period and which has passed through compensating circuit 21 and has a full bandwidth. The corrected signal appears at output 4 and represents a composite signal having the dual characteristics of being able to correct the horizontal and vertical apertures.

The delay devices or delay lines 11 and 12 are, in view of the high quality requirement imposed on them, formed as ultrasonic delay lines from quartz. Inasmuch as these lines operate only with a carrier frequency signal, the video frequency signal entering at input 1 is converted in a usual modulator into a carrier frequency signal which then enters the quartz conductor 11 and which is then demodulated at the end of the conductor 11.

The second delay line may, as hereinabove already mentioned, be made with a much simpler structure since it operates only with a much smaller bandwidth and it can operate with a much lower carrier frequency than the high quality delay line 11. It is, however, also possible to make both delay lines 11 and 12 of the same quality and to operate them on similar carrier frequencies. Then the carrier frequency, signal leaving delay line 11 may directly and without demodulation enter the second delay line 12 and a demodulation could take place only before the signal enters the conduit branch after junction point 2 leading to the low-pass filter 18. In this case a modulator can be spared before the input of delay line 12.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

I claim:

1. In a circuit arrangement for increasing the sharpness of the horizontal and vertical contours in a television picture by aperture correcting the video signal, the combination comprising input means for a television signal, a first delay means connected to said input means for delaying the television signal by one line period, second delay means coupled to said first delay means for delaying said television signal by a further line period, adding means for combining said undelayed and twice delayed television signals into a sum signal, means for reversing the polarity of said sum signal and reducing the amplitude thereof to half, second adding means for combining the output of said polarity reversing means with said once delayed television signal for obtaining said vertical aperture correcting signal, means for reversing the polarity of said once-delayed signal, means for compensating said once delayed television signal for transit time, third adding means for combining the output of the last-mentioned polarity reversing means and said compensating means for obtaining said horizontal aperture correcting signal, fourth adding means for combining the horizontal and vertical aperture correcting signals into a single correcting signal, and fifth adding means for combining the single correcting signal with the once-delayed television signal.

2. The combination as claimed in claim 1, further including a first low-pass filter means connected to said input means for reducing the bandwidth of said undelayed television signal, second low-pass filter means connected to the output of said second delay means for reducing the bandwidth of said twice delayed television signal, third low-pass filter means connected in the path of said once-delayed television signal before said second adding means for reducing the bandwidth of said once-delayed television signal.

3. The combination as claimed in claim 1, further including control amplifier means for individually adjusting the amplitude of said horizontal and vertical aperture correcting signals before said fourth adding means.

4. The combination as claimed in claim 1, further including means connected to the output of said fourth adding means for removing small amplitude signals from said combined single signal.